US006852813B2

United States Patent
Darlington, Jr. et al.

(10) Patent No.: US 6,852,813 B2
(45) Date of Patent: Feb. 8, 2005

(54) POLYMER-FILLED SHEET MATERIAL

(75) Inventors: Jerald W. Darlington, Jr., Marengo, IL (US); Natali A. Dotlich, Buffalo Grove, IL (US); Craig M. Mattern, West Chicago, IL (US); Richard Wilson Carriker, Woodstock, GA (US); Mark William Clarey, Chatsworth, GA (US)

(73) Assignee: Amcol International Corporation, Arlington Heights, IL (US)

( * ) Notice: Subject to any disclaimer, the term of this patent is extended or adjusted under 35 U.S.C. 154(b) by 134 days.

(21) Appl. No.: 10/254,946

(22) Filed: Sep. 25, 2002

(65) Prior Publication Data

US 2004/0059071 A1 Mar. 25, 2004

(51) Int. Cl.[7] .................................................. C08F 2/00
(52) U.S. Cl. ................. 526/223; 526/348.1; 526/329.7; 526/303.1
(58) Field of Search .............................. 526/223, 348.1, 526/329.7, 303.1, 303

(56) References Cited

FOREIGN PATENT DOCUMENTS

WO        WO 00/72958    * 12/2000

* cited by examiner

Primary Examiner—Ling-Siu Choi
(74) Attorney, Agent, or Firm—Marshall, Gerstein & Borun LLP

(57) ABSTRACT

In accordance with the method of manufacture described herein, it has been found that by applying a polymerization catalyst or polymerization initiator directly to a liquid-absorbent or liquid adsorbent (hereinafter collectively referred to as "liquid-sorbent") substrate, preferably a porous geotextile in sheet material form, to form a polymerization-initiating substrate or sheet material, a monomer that is subsequently embedded in the liquid-sorbent substrate will be completely contacted by the polymerization catalyst or polymerization initiator for complete polymerization of the embedded monomer to form embedded polymer solids, without the monomer partially polymerizing before contacting the substrate. It has been found that complete polymerization of the monomer while in contact with the substrate achieves best results in retention of embedded and interlocked polymer solids. Preferably only the polymerization catalyst or polymerization initiator, and optionally a cross-linker for the monomer, is applied to the porous substrate prior to embedding the monomer into the substrate. In another embodiment, the cross-linker is embedded into the substrate together with the polymerization catalyst and/or polymerization initiator.

32 Claims, 1 Drawing Sheet

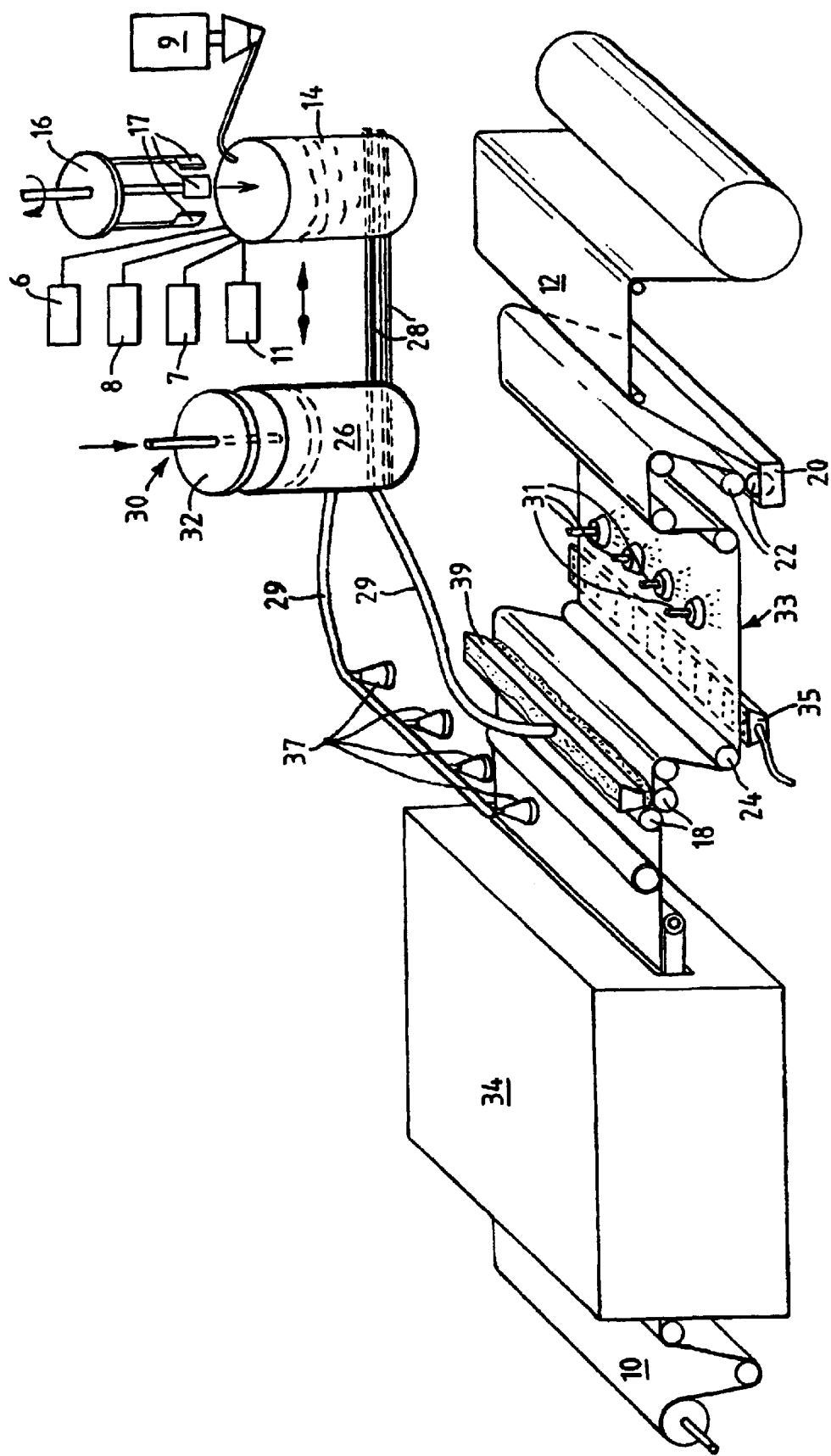

POLYMER-FILLED SHEET MATERIAL

FIELD OF THE INVENTION

The present invention is directed to a method of manufacturing a polymer-filled sheet material, and particularly to a continuous method of manufacturing the polymer-filled sheet material including the step of embedding a liquid polymerizable monomer into a liquid monomer-absorbent or liquid monomer-adsorbent substrate that contains a polymerization catalyst and/or a polymerization initiator for subsequent polymerization of the monomer, without premature polymerization of the monomer.

BACKGROUND OF THE INVENTION

Published PCT application WO 00/72958 A1 ('958) describes a porous substrate, such as a geotextile liner, containing a polymer, such as polyacrylamide and/or a polyacrylic acid, that is partially neutralized (e.g., polyacrylic acid and sodium polyacrylate), and preferably also clay. The polymer is formed for the most part, in situ, while the monomer is embedded into the geotextile, together with the clay, to provide a hydraulic barrier that has excellent, low hydraulic conductivity and has a significantly lower weight of active barrier material than the weight of active barrier material contained in geosynthetic liners in existence at the time of the '958 invention.

It has been found that the manufacture of an article, in accordance with WO 00/72958, results in a product that contains a substantial percentage of water, making it more difficult to apply the product over a surface to be protected against water penetration, and making shipping of the product more expensive, thereby detracting from the low weight advantage and cost savings attributed to having less active barrier material in the geotextile. Further, in accordance with WO 00/72958 A1, an aqueous polymerization solution, a polymerization catalyst, and a cross-linker are premixed and embedded into the porous substrate simultaneously during continuous manufacture. It has been found that only small batches of the polymerizable monomer can be prepared or the polymerizable monomer will begin to polymerize prior to embedding the polymerizable monomer into the porous substrate resulting in lower hydraulic barrier properties and decreased retention of solids.

SUMMARY OF THE INVENTION

In accordance with the method of manufacture described herein, it has been found that by applying a polymerization catalyst or polymerization initiator directly to a liquid-absorbent or liquid adsorbent (hereinafter collectively referred to as "liquid-sorbent") substrate, preferably a porous geotextile in sheet material form, to form a polymerization-initiating substrate or sheet material, a monomer that is subsequently embedded in the polymerization-initiating substrate will be completely contacted by the polymerization catalyst or polymerization initiator for complete polymerization of the embedded monomer to form embedded polymer solids, without the monomer partially polymerizing before contacting the substrate. It has been found that complete polymerization of the monomer while in contact with the polymerization-initiating substrate achieves best results in retention of embedded and interlocked polymer solids. Preferably only the polymerization catalyst or polymerization initiator, and optionally a cross-linker for the monomer, and/or an alkali neutralizing agent for the monomer or formed polymer, is applied to the porous substrate prior to embedding the monomer into the substrate.

A polymerization solution containing a polymerizable monomer that is void of polymerization catalyst or polymerization initiator can be mixed in large batches, and the batches will not polymerize prematurely, prior to being embedded into the liquid-sorbent substrate. Further, by providing a monomer-retaining substrate containing the polymerization catalyst or polymerization initiator, an effective polymerization solution can be conveyed to the substrate with a minimum amount of carrier, such as water and/or an organic solvent, such that the monomer-containing polymerization solution is easily embedded into the catalyst-containing or initiator-containing substrate, to minimize drying time and solvent expense.

Accordingly, one aspect of the articles and methods described herein is to provide a method of manufacturing a sheet material containing an embedded polymer that is polymerized essentially only while in contact with a liquid-sorbent polymerization-initiating sheet material by embedding a polymerizable monomer solution, that is void of polymerization catalyst and polymerization initiator, into a liquid-sorbent polymerization-initiating sheet material for contact with the polymerization catalyst and/or polymerization initiator and monomer polymerization, in-situ. The embedded monomer is polymerized only while in contact with the sheet material that has been pre-loaded with polymerization catalyst and/or polymerization initiator for the polymerizable monomer. In accordance with the methods disclosed herein, the preliminary step of first loading the sheet material, or the sheet material components, e.g., fibers used to make the sheet material, with a polymerization catalyst or polymerization initiator prior to contacting the sheet material with the polymerizable monomer, provides tenacious interlocking of the polymer within the substrate. Further, large batches of monomer-containing polymerization solution or slurry that are void of polymerization catalyst and/or a polymerization initiator for the polymerizable monomer can be prepared without premature polymerization of the monomer.

The method of manufacture permits the manufacture of an article that includes a polymer formed, in-situ, that is structurally secure and contains a sheet material reinforcement, e.g., sheet material fibers, intermingled with and structurally bound to the formed polymer, wherein the polymer may be contained throughout the thickness of the article or embedded in any portion of the sheet material, or in any cross-sectional thickness thereof by proper disposition of a polymerization catalyst or polymerization initiator to provide either a flexible or a rigid polymer-containing fabric material. The process disclosed herein permits the manufacture of various modified articles including articles that have concentrated areas of polymer; articles that substitute at least a portion of the polymer with one or more additional or alternative components, such as a water-swellable clay, e.g., a smectite clay with or without the polymer; and/or a contaminant-treating material, such as a zeolite or an organophilic clay for treatment of contaminants, e.g., organic contaminants in water or underwater bed material, e.g., soil; a maximum bonding of polymer to the sheet material; the application of layer(s) of water-impermeable or water-permeable sealing material(s) over one or both major surfaces of the article, such as a layer of a release material, a layer of a water-impervious film, or an adhesive layer to better seal the surface of the formed article; the application of solid or liquid adhesive materials or compositions to one or both major surfaces and/or to any of the edges of the article for even more complete retention of essentially all polymer that is polymerized during manufacture; the capability of inserting one or more rigidifying materials into or onto the article during manufacture, such as a sheet of fiberglass; rope; cardboard; relatively rigid corrugated materials, e.g., corrugated cardboard, and the like at some point within or between or onto the top and/or bottom major surfaces of the article to provide various degrees of flexibility or rigidity; and the adaptability to structurally consolidate or secure the fibers together, before, during or after polymerization surrounded by the polymer material(s), in any number of ways, such as needle-punching, sewing, quilting, saturation bonding, melting the polymer coating on adjacent fibers together in a densified or compressed state, adhesively bonding the fibers together, and/or chemically bonding the fibers together by melting the formed polymer; and providing a sheet material layer having various sizes and/or shapes and/or denier of fibers either alone or in admixture with other fibers to achieve the benefits of each when adhered to the formed polymer.

In one embodiment, the sheet material layer or liquid-sorbent substrate may be a loose mat of fibers that have been contacted or pretreated, e.g., by dipping or spraying, with a polymerization catalyst and/or a polymerization initiator, and the pre-treated mat is then contacted with a polymerizable monomer for in-situ polymerization of the monomer. In this embodiment, the loose mat of fibers may be consolidated to increase the density of the mat before, during or after polymerizing the monomer(s), in-situ. The article is consolidated to give the mat sufficient structural integrity for shipping, handling, and installation without significant loss of polymer. The polymer formed, in-situ, is surrounded by contacting fibers to form a polymer-filled sheet material, wherein the polymer is incorporated into at least a portion of the thickness of the article, within adjacent planes that define a rectangular depth of fibers, by virtue of being applied to the fibers during the manufacture of the sheet material. The monomer- or polymer-containing mat may be structurally consolidated, such as by sewing or needle-punching and/or melt-bonding polymer-coated fibers together, before, during, or after polymerization. Sewing or needle-punching can be accomplished from one or both major surfaces at spaced locations to provide a structurally sound fabric material preferably having a polymer homogeneously dispersed throughout the entire thickness, or over only a portion of the thickness of the article. The monomer may be polymerized as a fiber coating in a loose mat article that is consolidated, e.g., by needle-punching, and the polymer then heated to its melt temperature (preferably immediately after exiting the polymerization oven, while hot) such that the consolidation step brings adjacent polymer-coated fibers into contact for polymer intermixing from adjacent fibers. At this point, the mat can be cooled to below the melt temperature of the polymer to fuse adjacent fibers together with solidified polymer.

The method of manufacture allows great flexibility to form polymer-filled, or partially-filled fabrics uniformly or partially filled with one or more polymers at various adjacent or spaced planes, of any desired thickness, along the thickness of the finished fabric and for varying the quantity and location of the polymer that is securely incorporated between and secured to the fibers or other component parts of the article. Further, by adding the polymerizable monomer before consolidation of the mat, the formed polymer is more tenaciously held to and between adjacent fibers and, therefore, is less likely to be lost from the finished fabric during storage, shipping or installation.

Either the polymerization catalyst or initiator, or the monomer can be withheld from a portion of the mat, if desired, to provide for one or more polymer-free volumes or cross-sectional areas to provide a space or volume for monomer expansion during polymerization, or to provide free volume(s) for the addition of other additives, such as powdered or granular materials, such as a water-absorbent clay, e.g., sodium or calcium montmorillonite clay, an organophilic clay, a zeolite or other contaminant-treating material, as disclosed in this assignee's U.S. Pat. Nos. 5,043,076 and 5,237,945, both patents hereby incorporated by reference. For example, sufficient fabric porosity can be provided by omitting the polymer addition throughout a predetermined thickness at the top major surface, bottom major surface, or along an intermediate three dimensional thickness of the finished article to permit lateral gas venting through the unfilled portion of the article. Alternatively, the polymer can be concentrated near the top or bottom surface fibers in one or both major surfaces to permit the polymer layer to extrude from the interior of the article to a planar surface immediately above and/or below one or both exterior surfaces of the article, thereby creating a sealing layer of polymer capable of sealing at overlaps and seams between adjacent or overlapping articles.

The article of manufacture of the present invention can maintain a relatively heavy, uniform distribution of polymer dispersed among and strongly adhered to sheet material fibers. In other embodiments, water-impermeable layers can be adhered to one or both major exterior surfaces of the article, or placed between adjacent articles or layers of a single article or at an overlap of adjacent articles during installation to provide additional or safety layers of impermeability, when using the article as a land fill barrier, pond liner or other well known uses as a water barrier.

In accordance with an important and optional feature of one embodiment of the present invention, a loose mat of fibrous sheet material is consolidated (structurally secured together to define a final thickness) before, during, or after polymerization of a monomer impregnant, applied after contacting the sheet material or its component parts, e.g., fibers, by needle-punching, sewing, quilting, and/or melt-bonding polymer-coated fibers together. The consolidation step is performed while the loose mat of fibers is compressed, so that needle-punching will entangle vertically displaced fibers with horizontally oriented fibers. Lubrication is accomplished by the wet monomer, or water may be added for needle lubrication after complete monomer polymerization. Further, needling or sewing can be eliminated simply by compressing the loose mat together while the polymer is at or above its melt temperature, and then cooling the polymer to solidify the polymer while the mat is compressed sufficiently for contact of adjacent polymer-coated fibers.

In accordance with one embodiment of the present invention, the fibers, at least a portion of which are surrounded by the monomer or polymer, can be interconnected by needle-punching. During needle-punching, a plurality of horizontally oriented fibers or filaments or strands of material are displaced from a generally horizontal orientation and forced into a generally vertical orientation by a plurality of needles that are punched vertically into one or both major surfaces of the article, while the article is in mat form, through at least a portion of the thickness of the article, during manufacture. During needle-punching, the article is compressed to approximately its final thickness, and the displaced fibers partially structurally secure the mat together, in its compressed or reduced thickness form and adjacent fibers are more permanently held together by the formed polymer. The fibers, filaments or strands of material can be consolidated in a number of ways before, during, or after monomer polymerization to permanently interconnect the fibers in a compressed, relatively dense form, such as by needle-punching, melting the polymer coating of adjacent fibers together, and solidifying the melted polymer, such as by cooling below the melt temperature, while compressing the article sufficiently for polymer contact at adjacent fibers, to secure adjacent fibers together and consolidate the fibers of the mat into a single, more dense polymer-containing fabric layer of any desired thickness. The polymer-coated fibers of the finished article may surround a powdered or granular, e.g., water-absorbent, material, such as a water-absorbent clay or other filler or active material. When the powdered or granular material is a water-swellable clay, e.g., sodium bentonite, the clay preferably is included in the article in an amount sufficient to substantially impede the flow of water through the article.

Accordingly, one aspect of the present invention is to provide a new and improved article of manufacture and method of making the article by incorporating a polymerizable monomer into a polymerization catalyst-containing or polymerization initiator-containing mat of fibers during fabric manufacture and thereafter consolidating the monomer- or polymer-containing fibrous mat to tenaciously bind the fibers together with formed, solidified polymer-bonded fibers of the consolidated fabric, to provide unexpected structural integrity to the article.

Still another aspect of the present invention is to provide a new and improved article of manufacture including a water-swellable sodium montmorillonite and/or sodium bentonite clay incorporated throughout the fibers of a flexible fabric material, formed by one or more air-blowing processes, that is consolidated by sewing or needle-punching. Polymer coated on outer fiber surfaces can be melt-bonded together and/or coated with an aqueous solution of an adhesive, to strengthen the article, lubricate the needle penetration and/or to stiffen the article for easier installation, and to prevent sagging when installed over a non-planar earthen surface.

Another aspect of the present invention is to provide a new and improved article of manufacture including a polymer, incorporated into fibers of a flexible fabric material where the fibers of the article may be a blend of synthetic and/or natural fibers of differing length, thickness, composition and/or physical or chemical properties.

Still another aspect of the present invention is to provide a new and improved waterproofing sheet material article membrane, capable of holding water disposed above the membrane such that water permeates the membrane at a rate of $1 \times 10^{-7}$ cm/sec or less, wherein the membrane is formed from a mat containing about 5% to about 90% fibers and about 10% to about 95% water-absorbent or water-adsorbent polymer, preferably more than 50% by weight, based on the dry weight of the article. The membrane contains a water-absorbent or water-adsorbent polymer material surrounding at least a portion of the fibers that the polymer is adhered to. The article may be consolidated to densify the sheet material and further structurally secure the fibers together while interlocking the polymer in place surrounding and secured to the fibers by, in-situ, polymerization. The sheet material thus manufactured can maintain a homogeneous, even distribution of polymer material or, if desired, the polymer, with or without a powdered or granular waterproofing material, such as a water-swellable clay, can be concentrated throughout any desired portion of the article.

Another aspect of the methods and articles disclosed herein is to provide a method of manufacturing a sheet material that includes a formed polymer, and optionally one or more fillers, structurally reinforced with a liquid-sorbent sheet material, particularly a fibrous sheet material, such as a geotextile, woven or non-woven, by loading the geotextile, or the fibers used to make the geotextile, with a polymerization catalyst or a polymerization initiator to form a polymerization-initiating sheet material, and thereafter embedding one or more polymerizable monomers into the geotextile. Monomer polymerization does not begin until the monomer contacts the polymerization-initiating sheet material, such that the monomer is essentially completely polymerized, in-situ, for tenacious adherence of the polymer to the sheet material and, optionally, sufficient cross-linking of the polymer. Sufficient cross-linking is achieved with at least about 0.01% by weight, preferably at least about 0.1%, cross-linker, based on the weight of polymerizable monomer. It is preferred to add the monomer cross-linking agent in a ratio of cross-linking agent to monomer in the range of about 1:100 to 1:1000; more preferably in the range of about 1:250 to 1:750; most preferably in the range of about 1:400 to 1:600.

The above and other aspects and advantages of the manufacturing method and articles disclosed herein will become more apparent from the following detailed description taken in conjunction with the drawings.

BRIEF DESCRIPTION OF THE DRAWING

The FIGURE is a schematic flow diagram of the preferred method of manufacturing a polymer-loaded sheet material;

DETAILED DESCRIPTION OF THE PREFERRED EMBODIMENTS

The present invention may be understood more readily by reference to the following detailed description of the invention and the examples provided therein. It is to be understood that this invention is not limited to the specific components, articles, processes and/or conditions described, as these may, of course, vary. It is also to be understood that the terminology used herein is for the purpose of describing particular embodiments only and is not intended to be limiting.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Referring to the drawing, the invention relates to a polymer-filled sheet material 10. In one embodiment, the polymer-filled sheet material 10 is an interlocking matrix containing an organic polymer polymerized, in-situ, and interlocked and secured to a liquid monomer-absorbent or liquid monomer-adsorbent substrate, wherein the polymer is formed (polymerized from one or more monomers) while in contact with the substrate during manufacturing the polymer-filled sheet material to interlock the polymer to the substrate. In the preferred embodiment, the sheet material 10 is an interlocking matrix of organic polymer molecules and fibers of a fibrous substrate 12, preferably a non-woven fabric or geotextile.

Various reinforcing materials can be included within the interior and/or exterior of the article to provide structural reinforcement or to provide various degrees of article rigidity; portions of the article along its thickness can be manufactured to include different fibers or the same fibers having different sizes, lengths, thicknesses and densities to achieve the properties and characteristics of the various fibers; portions of the article along its thickness can be left with low concentrations of or without a polymer so that a portion of the article is very porous to allow for venting of gases captured by the article from below; and powdered or granular materials such as a water-swellable clay can be intermixed with the fibers being deposited from a fiber deposition device during the fall by gravity of the fibers onto a support surface, to provide a clay-filled mat that is then contacted with monomer polymerization catalyst or polymerization initiator prior to contact with the polymerizable monomer. Any of these features can be used alone or together with any of the other features to provide very unique polymer-filled articles having any number of different properties.

In accordance with one important embodiment of the present invention, it has been found that the polymer-filled mat can be needle punched, sewn or otherwise compressed together to interlock adjacent fibers of a single fabric, or to interlock upper and/or lower fabric layers to reinforce the filled polymer. The fibers may be secured together structurally with threads, fibers, filaments or strands of fiber material that has been needle punched to interlock the fibers together at spaced intervals (e.g., 2 to 500 mil spacing, preferably about 2 to about 20 mil spacing). An optional outer coating of liquid adhesive on one or both outer surfaces of the consolidated mat substantially increases the strength of the article.

In accordance with another important embodiment of the present invention, in addition to providing polymer-filled sheet material articles of manufacture, the articles may be manufactured to include, in addition to a polymer, a water-swellable clay, or a material capable of removing, or interacting with, one or more water-soluble contaminants contained in water that contact the polymer-filled sheet material article.

Some of the most prevalent contaminants found in waste waters contained in ponds, lagoons, areas of subterranean structure and other water-releasing areas, particularly where these areas include industrial waste waters, are heavy metal ions and water-soluble organic materials. It is well known in the prior art that natural and synthetic zeolites are capable of removing a substantial portion of the heavy metal ions from a waste water solution and that organophilic clays are capable of removing water-soluble organic materials from solution. However, the prior art suggests that removal of these materials from waste water streams should be done on-stream, treating the entirety of the waste water stream in order to remove these materials, requiring frequent replacement of treating materials because of the heavy volumes of waste water that pass through the zeolites or pass through the organophilic clays in order to clarify these waste water streams. In accordance with an important feature of the present invention, it has been found that by including an organophilic clay with or without a water-swellable clay, such as sodium bentonite, and/or applying the mixture of water-swellable clay with a zeolite or organophilic clay, as part of the monomer solution or slurry, the water-swellable clay will expand upon hydration and the zeolite and/or organophilic clay combined with the water-swellable clay will form a water-treatment material wherein the zeolite and/or organophilic clay will last many times longer than it would if the entire waste water supply were treated as in the prior art with full contact of the entire volume of the waste water stream, since only the quantity of water will be treated that permeates the water-swellable clay and/or polymer.

In accordance with another important embodiment of the present invention, the contaminant interacting material, comprising any organic contaminant-adsorbent, e.g., an organoclay or zeolite; organic contaminant-absorbent; organic contaminant-reactant; or organic contaminant-neutralizing material can be supplied as a separate material above or below or intermixed with the monomer and/or water-swellable clay so that the amount of material treated for the removal of contaminants is only that material which penetrates the polymer and/or water-swellable clay. In this embodiment, the preferred articles of manufacture contain a layer of a water-absorbent material selected from the group consisting of a water-absorbent polymer, a water-absorbent clay and a combination thereof; and a layer of an organic contaminant-removal material, such as an organic compound-adsorbent material disposed above or below the water-absorbent material, such as an organoclay or a zeolite, disposed such that any organic contaminant that passes through the layer of water-absorbent material is adsorbed by the organic compound-adsorbent material. The two layers of (1) water-absorbent material and (2) organic contaminant-adsorbent material can be disposed adjacent each other and surrounded by separate fabrics that are needle-punched together; or the layers can be disposed within separate fabrics, e.g., geosynthetic fabric layers that can be stacked one above the other and may or may not be secured together, e.g., by needle-punching, melt bonding, adhesively, or otherwise. In accordance with one embodiment, the articles can be disposed underwater to overlie a contaminated waterway soil bed such that organic contaminants, e.g., PCBs, must pass through a water-absorbent material, e.g., a water-absorbent polymer and/or a water-absorbent smectite clay, before being adsorbed by the layer of organic compound-adsorbent material, e.g., an organoclay and/or zeolite, to prevent the organic contaminant from contaminating the water above the article of manufacture.

In accordance with another important feature of this embodiment of the present invention, the organic contaminant-removal material may be mixed with the polymer, or supplied as a separate material below or above the polymer and can be any material capable of adsorbing, absorbing, or reacting with the organic contaminant for adsorption, absorption, insolubilization or for neutralization of the organic contaminant. Examples of additional materials capable of adsorbing, removing or neutralizing organic contaminants include absorbent fibers, such as microcrystalline cellulose; attapulgite clay; zinc ricinoleate absorbed on an absorbent fiber or other absorbent material; amorphous silica powder; synthetic calcium silicate; polyolefin pulp; sodium alumino-silicate (type A sodium zeolite); maltodextran; sodium silica aluminates (note that all the above are absorbents). Other materials, such as adsorbents include organoclays; microcrystalline cellulose; silica hydrogel-based compositions; attapulgites; synthetic sodium magnesium silicates; synthetic calcium silicates; silicon dioxide; acid activated clays; type A sodium zeolites; and the like provided as a separate layer or mixed with the polymer and/or water-swellable clay. Other materials can be included such as an algicide, antimicrobial material, bactericide, disinfectant, and/or fungicides such as phenol; zinc undecylenate N.F.; acetyl tyridinium chloride N.F.X.III, and the like.

The most preferred additive, in addition to the monomer, is a water-swellable clay.

The fibers useful in forming the polymer-filled articles of manufacture of the present invention are, for example, fibers made from rayon, polyethylene, polypropylene, polyesters, nylon, acrylic polymers and copolymers, fiberglass, propylene-ethylene copolymers, polypropylene-polyamide copolymers, polyurethane fibers, dissolvable, e.g., polyvinyl alcohol fibers, and the like. The preferred fiber length is in the range of about 0.5 to about 25 inches, more preferably about 1 to about 5 inches, and a preferred fiber denier is in the range of about 1 to about 5000, with a more preferred fiber denier of about 4 to about 500, and most preferably about 30 to about 200. The fibers used to manufacture geotextile fabrics, or the geotextile fabrics, are preferred for their bacteriological and chemical resistance but the fibers can be biodegradable since, once positioned, the fabric has little importance except as a means to hold a polymer in the proper position. In some installations, the thickness of the article is not important and such articles can be formed with any desired thickness, e.g., 3 mils to about 4 inches containing about 0.2 to about 20 pounds per square foot of polymer, with or without about 0.2 to about 30 pounds per square foot of a water-swellable clay.

In accordance with another embodiment, a portion or all of the fibers used in manufacturing the sheet material products of the present invention are water-degradable or water-dissolvable, e.g., polyvinyl alcohol fibers, such that after a predetermined water contact time, substantially only the polymer and other additive material remains. The water-degradable or water-dissolvable fibers also can be selectively incorporated into the products of the present invention, for incorporation only along the edges of the product, where the products may be seamed or overlapped with another similar product, thereby dispersing the polymer into the seam areas upon hydration. Other filtering materials, such as activated carbon and the like, can be incorporated into the products, as well as various water-impermeable sheet materials, geogrids or polymeric netting materials, monofilaments, and other geotextiles, either woven or nonwoven, can be incorporated within the interior of the product or on one or both exposed major surfaces to provide additional structural strength, and/or additional water-impermeability.

The products of the present invention can be essentially a single non-woven fabric material, so that it can elongate, where elongation is a desirable characteristic, while retaining the desired polymer properties where needed. Further, drainage structures and other articles used in the water barrier and water drainage arts can be virtually incorporated into the interior of this product during manufacture. Herbicides, bactericidal materials, tracer chemicals, various colorants that indicate contact with a particular chemical or class of chemicals, and the like, also can be incorporated into the articles of the present invention. Fertilizers can be incorporated in the interior or near an exposed surface of the product. This embodiment is particularly useful with water-soluble polymers for time-release properties of the sheet material in releasing fertilizers.

In another embodiment, fibers capable of dissolving upon contact with a solvent can be incorporated into the articles near one or more edges. After complete installation of the products containing solvent-dissolvable fiber, solvent can be applied at the seams or overlap areas to expose the polymer and to provide more effective sealing at the seam or overlap areas.

The uses for the polymer-filled or partially-filled products of the present invention are virtually infinite since the product can be made completely flexible, relatively rigid or rigid and can be applied against very contoured and sloping surfaces, rough or smooth, as well as vertical surfaces, such as foundation walls, dams, along the sides of canals and below grades such as in tank farms, and for irrigation and water conservation techniques for below grade waterproofing and below grade lining materials under plaza decks, concrete and the like. The product has a substantial advantage in that space can be provided within the fabric structure for the expansion of polymer and/or a water-swellable clay such that wetting of the product disposed adjacent to concrete slabs and plaza decks will not cause buckling or cracking of the adjacent concrete or other structural members due to extensive water-swellable clay expansion. The products of the present invention permit the expanding polymer and/or clay to expand within the product, either laterally or vertically, or both, within space provided in the product to prevent undue forces from being applied to the adjacent surface of concrete or other structural members.

The products of the present invention are particularly well suited for providing a water barrier in shored wall conditions to protect surface areas that are either vertical, sloped, and/or horizontal. The products are very durable because of the method of manufacture, since strength is not dependent upon any method of structurally securing two separate fabric layers together.

The polymer-filled fabrics of the present invention also are particularly well suited for providing a water barrier beneath concrete that is sprayed in layers over the outer surface of polymer- and, optionally, clay-containing articles of the present invention, such as Shotcrete and Gunite concretes that are spray applied. In the Shotcrete and Gunite methods of applying concrete, the concrete composition is sprayed under substantial pressure onto a surface to be protected in a thin layer which dries almost instantaneously so that additional layers can be applied thereover to any desired thickness. The layered water barrier products of the prior art, having an intermediate clay layer glued or needle punched to two exterior fabric layers, do not have the structural strength and resistance to shear forces required to prevent the spray application of concrete from virtually forcing the intermediate clay layer out of the product, leaving very little to no water barrier capability. The products of one embodiment of the present invention include the polymer, and optionally a water-swellable clay, tightly held surrounding the fibers of a single fabric so that substantial pressure and force applied by a sprayed layer of concrete thereover will cause essentially no loss of polymer or water-swellable clay. Further, the products of the present invention absorb forces applied to the surface of the fabric so that the Shotcrete or Gunite spray applied concrete layers will not bounce off the products but will adhere to the fabric surface for efficient and economical application of concrete over the surface of the sheet material product while maintaining an effective water barrier thereunder. One method of manufacturing the articles as a single fabric is by incorporating a water-swellable clay and/or polymer in one layer, as disclosed herein, and including a zeolite or organophilic clay in another layer as the fabric is manufactured, as disclosed in this assignee's U.S. Pat. No. 5,237,945, incorporated herein by reference.

The preferred organic polymer is a water-absorbent polymer preferably comprising a mixture of an alkali metal salt of polyacrylic acid and polyacrylic acid. It has been found that the interlocking of the organic polymer to the substrate 12 provides a hydraulic barrier material 10 having a relatively low permeability to water while containing a relatively low loading of organic polymer.

It has further been found that the hydraulic barrier material 10 containing both a water-absorbent polymer and a water-swellable clay, provides reduced permeability to water per unit weight of hydraulic barrier material as compared to conventional liners or hydraulic barriers, and in particular, geosynthetic clay liners (GCLs). Particularly, it has been found that the hydraulic barrier material 10 should have a hydraulic conductivity of $1 \times 10^{-8}$ cm/sec, or less, preferably $1 \times 10^{-9}$ cm/sec. or less. Further, it has also been found that the hydraulic barrier material 10 may have a reduced thickness and a reduced weight as compared with conventional GCLs. The hydraulic barrier material 10 may be particularly suitable for geo-environmental applications such as water absorption, water retention and water containment. For instance, the hydraulic barrier material 10 may have particular application for use in below-grade water proofing, such as in underground parking garages, shopping malls, and the like, to prevent ground water intrusion; waste landfills; man-made bodies of water and other geo-environmental applications where a low permeability hydraulic barrier is required. In the preferred embodiment, the organic polymer is formed or produced from the polymerization of an organic monomer intercalated into a clay, preferably a water-swellable clay. The method of making the hydraulic barrier material 10 includes the steps of embedding a polymerizable organic monomer within a porous substrate after first applying a polymerization catalyst or polymerization initiator to the porous substrate, or to one or more of the component parts of the porous substrate, e.g., to fibers of a geotextile during the manufacture of the geotextile, and effecting polymerization of the polymerizable monomer, in situ, to form the hydraulic barrier material 10.

The polymerizable monomer is applied to the polymerization-initiating substrate from a polymerization solution containing the polymerizable organic monomer. In the preferred embodiment, the polymerization solution also contains clay, preferably a water-swellable clay such as a sodium smectite clay, particularly a sodium montmorillonite or a sodium bentonite clay, to form a slurry 14 that is embedded into the porous substrate 12 that has previously been treated, e.g., contacted or dipped or sprayed, to contain a polymerization catalyst or polymerization initiator for the organic monomer in an amount sufficient to fully polymerize the subsequently embedded monomer. In the preferred embodiment, the polymerization solution mixing step is performed such that the polymerization solution is substantially homogeneous.

The polymerizable monomer is mixed with water and includes a neutralizing agent, such as sodium hydroxide, preferably prior to the addition of any optional clay, to form the polymerization solution 14, which is in the form of a slurry if a water-swellable clay also is added, in order to more easily effect neutralization of least a portion of the polymerizable organic monomer (most preferably 65–85 mole percent neutralization) before clay addition and subsequent intercalation of the partially neutralized polymerizable organic monomer into the clay. Preferably, the polymerization solution also contains a cross-linking agent for the polymer so that after polymerization, the partially neutralized polymer molecules are cross-linked sufficiently for water-insolubility and water absorbency. Preferably, the polymerizable monomer is thoroughly mixed with water to form a homogeneous solution prior to adding clay to the polymerization solution for consistency and homogeneity in intercalation of the clay. In the preferred embodiment, the polymerization solution mixing step is performed such that the polymerization solution is substantially homogeneous.

The optional step of adding clay to the monomer solution to form a polymerization solution or polymerization slurry 14 may be performed in any manner that results in the addition of a desired amount of the clay and monomer to form a polymerization slurry 14 that is relatively viscous, but is capable of being moved to the polymerization-initiating substrate 12 for embedment. In addition, the polymerization solution containing the clay is preferably sheared during mixing and/or sheared while embedding the slurry into the porous substrate to intercalate a portion of the polymerizable monomer between clay platelets prior to embedding the slurry 14 into the substrate 12, and preferably to partially exfoliate the clay platelets prior to, or simultaneously with, contacting the porous substrate 12 with the polymerization slurry 14.

The degree of mixing of the slurry 14 will vary depending upon the desired characteristics of the slurry 14. For instance, the clay may be simply combined together with the polymerization solution with no concern regarding the degree of mixing or homogeneity of the resulting slurry 14. Preferably, the mixing step is performed such that the slurry 14 is mixed and sheared prior to the subsequent embedding of the slurry 14 into the catalyst- or initiator-containing substrate 12. In the preferred embodiment, the mixing step used to form the slurry is performed such that the slurry 14 is substantially homogeneous.

Any mixer 16 may be used which is capable of mixing the clay and the monomer solution to achieve the desired characteristics of the slurry 14. In the preferred embodiment, mixer 16 includes slurry scrapers 17 and is capable of mixing the clay and the polymerization solution such that the resulting slurry 14 is substantially homogeneous. In the preferred embodiment, the mixing step is performed for a length of time sufficient to mix the clay and the polymerization solution such that the resulting slurry 14 is substantially homogeneous. Minimum water is preferably used to obtain a homogeneous slurry, while producing a slurry that is capable of being mechanically conveyed or pumped to the substrate 12 for embedding the slurry into the substrate. As shown in FIG. 1, in the preferred embodiment, a piston 32 of piston assembly 30 is used to convey the high viscosity slurry to the liquid-sorbent substrate for the embedding step. If the slurry is too viscous for pumping, a conveyor belt, preferably having a slurry-covered width that is the same as the substrate 12, can be used to move the slurry to the substrate 12 for embedment therein.

As indicated above, the monomer embedding step comprises commingling the polymerizable organic monomer/clay slurry with the substrate 12.

In the preferred embodiment, the slurry 14 is embedded within the catalyst-containing, liquid-sorbent substrate 12 at a slurry viscosity of about 30,000 centipoises to about 80,000 centipoises, more preferably about 40,000 to about 60,000 centipoises, for absorption and/or adsorption of the slurry 14 into and/or between the components of the substrate 12. The slurry 14 is received into at least a portion of the thickness of the substrate 12. Any amount or degree of embedding of the slurry 14 into, or between the component parts of the substrate 12 is acceptable so long as the embedding of the monomer is sufficient to permit the commingling and sorption of the monomer and clay between and/or within the component parts, e.g., the fibers of the substrate, for subsequent polymerization of the monomer internally within at least a portion of the thickness of the substrate to form the hydraulic barrier material 10. Further, the degree or amount of embedding is sufficient if it permits the bonding or interlocking of the resulting absorbent polymer and clay within at least a portion of the thickness of the substrate 12.

Preferably, the embedding step includes combining the substrate 12, and the slurry 14 such that the slurry 14 is distributed uniformly throughout at least a portion of the thickness of the substrate 12. The slurry 14 is preferably well mixed, and more preferably is substantially homogeneous, so that combining the slurry 14 and the substrate 12 also results in the distribution of the monomer, monomer-intercalated clay, and exfoliated clay platelets throughout a desired thickness of the substrate 12. More preferably, the slurry is distributed throughout the entire thickness of the porous substrate 12 in order to facilitate the production of a relatively homogeneous hydraulic barrier material 10.

As discussed previously, the porous substrate 12 may be any liquid-absorbent or liquid-adsorbent porous material or substance compatible with the monomer and any other components contained with the polymerization slurry 14, where applicable. Any liquid-sorbent substrate may be used that is able to receive and retain at least a portion of both the polymerization catalyst or polymerization initiator, and subsequently the polymerizable monomer(s), and optionally clay, to form the hydraulic barrier material 10 upon the polymerization of the monomer. More preferably, the substrate 12 is comprised of a fibrous substrate 12 having a plurality of fibers. Any fibrous substrate 12 can be used that is able to form the hydraulic barrier material 10 upon the polymerization of the monomer.

In the preferred embodiment, the substrate 12 is a geotextile material. Any woven or non-woven geotextile material may be used, preferably non-woven. Further, the geotextile material may be in any form compatible with providing the desired hydraulic barrier material 10. However, in the preferred embodiment, the fibrous substrate 12 is a substantially planar sheet comprising at least one layer of geotextile material.

In the preferred embodiment, the embedding step is comprised of embedding the slurry 14, having a water content of less than 50% by weight, and thus the monomer and clay, between the fibers of the initiator- or catalyst-containing substrate 12. The embedding step may be performed in any manner, and by any apparatus, resulting in the embedding of the high viscosity slurry 14 between, and/or absorbed within the component parts, e.g., fibers, of the substrate 12. In other words, the slurry 14 can be embedded or directed within the interstitial spaces or voids between and/or absorbed within the fibers of the fibrous substrate 12, and/or may be absorbed by the fibers of the substrate 12. For instance, the slurry 14 may be embedded between the fibers of the fibrous substrate 12 by vacuum, scrubbing, rolling, hydraulic loading, pressure filtration or spraying. If the fibers themselves are water-absorbent, the monomer will be absorbed into the fibers as well.

In the preferred embodiment, at least a portion of the slurry 14 is embedded between the fibers of the fibrous substrate 12 in the interstitial spaces or voids. The remainder or balance of the slurry 14 which is not embedded may be dispersed or spread among the fibers of the fibrous substrate 12 or distributed upon or about the fibers to provide a layer or coating of the slurry 14. Any amount or degree of embedment of the slurry 14 between the fibers of the substrate 12, sufficient to permit the subsequent polymerization of the monomer, is acceptable.

In the preferred embodiment, a major proportion of the slurry 14 is embedded in the substrate 12, while a minor proportion of the slurry 14 optionally may be dispersed or distributed on top of the substrate 12. Preferably, any slurry 14 that may be distributed on top of the substrate 12 has a thickness of less than about 2.0 mm, more preferably less than about 1.0 mm, most preferably less than about 0.50 mm for effective adherence of the formed polymer and clay to the surface of the article 10.

Further, in the preferred embodiment, the slurry 14 is embedded between the fibers of the fibrous substrate 12 by applying a compressive force to the fibrous substrate 12. The compressive force is preferably applied in a direction substantially perpendicular to the plane of the fibrous substrate 12, as discussed further below. The compressive force may be applied in any manner, and by any method, or apparatus that results in the desired degree or amount of embedding of the slurry 14 between the fibers of the fibrous substrate 12.

For instance, the compressive force may be applied to the fibrous substrate 12 with at least one pair of pressure rollers 18 as shown in FIG. 1. In addition, the compressive force may be applied to the fibrous substrate 12 using a vacuum.

Following the embedding step, the process comprises the step of effecting the polymerization of the monomer to form the hydraulic barrier material 10. The polymerization of the monomer may be effected in any manner suitable for polymerizing the monomer to form a hydraulic barrier material 10 having the desired properties and characteristics. Preferably, polymerization of the monomer is effected by heating the monomer in a continuous oven after the embedding step. Preferably, the heating step is sufficient to dry the hydraulic barrier to less than about 15% by weight moisture, more preferably about 7–12% by weight moisture based on the dry weight of the hydraulic barrier 10.

The heating step may be performed at any temperature above the boiling point of water to polymerize the monomer and form the hydraulic barrier material 10. However, the temperature of the heating step may vary depending upon the desired characteristics and properties of the resulting hydraulic barrier material 10. It has been found that the slurry 14 is preferably heated to a temperature of at least 100° C. (212° F.), more preferably about 140° C. to about 288° C., most preferably about 177° C. to about 288° C., particularly about 204° C. to about 260° C. In the most preferred embodiment, the slurry 14 is heated to a temperature of between about 232° C. and about 260° C.

Any heater 34 may be used which is capable of heating the slurry 14, and thus the monomer, to the desired temperature to polymerize the monomer while embedded within substrate 12, without melting or otherwise degrading the substrate 12. Further, the heating step may be performed for any length of time sufficient to form a hydraulic barrier material 10 having the desired water barrier properties. For instance, the heating step may be performed for a period between about 30 seconds and about 2 hours. However, the amount of the monomer polymerized by the heating step may vary depending upon the length and temperature of the heating step, which may affect the characteristics or properties of the resulting hydraulic barrier material 10. Further, the duration of the polymerization reaction or the period of performance of the heating step has been found to be inversely proportional to the polymerization temperature.

In accordance with an important advantage of the preferred embodiment of the manufacturing method disclosed herein, no significant polymerization of the monomer occurs prior to embedding the polymerization slurry into the substrate 12, with most polymerization occurring during the indicated polymerization step or heating step, since the polymerization catalyst or polymerization initiator is isolated from the monomer until the monomer is embedded in the substrate 12. Thus, in the preferred embodiment, no significant polymerization of the monomer occurs prior to the embedding of the slurry 14 between the fibers of the initiator- or catalyst-containing fibrous substrate 12. Thus, prior to the heating step, the polymerization of the monomer does not occur until the monomer is embedded within the initiation- or catalyst-loaded substrate. The inhibiting of monomer polymerization prior to the monomer embedding step is a significant advantage of the manufacturing method disclosed herein. Depending upon the intended application of the hydraulic barrier material 10, the hydraulic barrier material 10 may optionally include a covering sheet and/or a carrier sheet disposed above and below the article 10. Specifically, the covering sheet 24 is preferably applied along at least one side of the substrate 12, being a geotextile material in the preferred embodiment.

In the preferred embodiment, the substrate 12 can be any water-absorbent or water-adsorbent sheet material. Further, the substrate 12 is preferably a fibrous substrate having a plurality of fibers. More preferably, the fibrous substrate 12 is a geotextile material. Any geotextile material, including both woven and non-woven geotextiles, having any weight and formed from any material capable of withstanding the polymerization temperature, may be used which is compatible with the intended application of the hydraulic barrier material 10 and which will provide a hydraulic barrier material 10 having the desired water barrier properties. However, preferably, the geotextile material has a unit weight of between about 0.05 and 0.80 kg/m$^2$, more preferably from 0.10 to 0.40 kg/m$^2$, most preferably from 0.10 to 0.20 kg/m$^2$.

Further, the geotextile material may be in any form compatible with providing the desired hydraulic barrier material 10 in any size or shape to fit any area to be protected against substantial water contact. In the preferred embodiment, the fibrous substrate 12 is a substantially planar sheet comprising at least one layer of the geotextile material. Thus, as discussed above, in the preferred monomer embedding step, a compressive force is applied in a direction substantially perpendicular to the plane of the geotextile material 12. In the preferred embodiment, the fibrous substrate 12 is comprised of a layer of geotextile material, such as PETROMAT 4597, PETROMAT 4551 or PETROMAT 4506 manufactured by Amoco, or, more preferably, a polyester material GEO-4-REEMAY 60, manufactured by Foss, Inc., having a thickness of 2 mm; or another polyester material, 25WN040-60, manufactured by CUMULUS Corporation, at a thickness of 5 mm.

The aqueous polymerization solution includes water, and an amount of a polymerizable organic monomer. Any organic monomer able to be polymerized to provide a water-absorbent organic polymer, may be used. However, preferably, the organic monomer has the following structural formula:

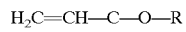

wherein R is selected from the group consisting of an alkali metal, H, $CH_3$, $CH_2CH_3$, $CH(CH_3)_2$; and mixtures thereof.

In the preferred embodiment, the monomer is selected from the group consisting of acrylic acid, an alkali metal acrylate, e.g., sodium acrylate, and particularly mixtures thereof containing 50–90 mole percent of an alkali metal acrylate and 10–50 mole percent acrylic acid, more preferably about 65–85 mole percent alkali metal acrylate and 15–35 mole percent acrylic acid, based on the total moles of polymerizable monomer.

Referring specifically to the embodiment that includes clay in the polymerization slurry 14, it has been found that the weight ratio of the organic monomer (or polymer) to clay embedded into the substrate sufficient to produce the desired hydraulic barrier material 10 most efficiently, with little to no drying required after monomer polymerization, should be in the range of 1:1 to 1:5, preferably in the range of 1:1 to 1:4, most preferably in the range of 1:2 to 1:4, based on the total weight of monomer, neutralized monomer and clay in the slurry.

The invention disclosed herein is useful for loading any liquid-sorbent substrate, particularly sheet material, with a monomer/clay slurry wherein the polymer is polymerized, in-situ, after pre-loading the porous substrate with sufficient polymerization catalyst and/or polymerization initiator to completely polymerize the polymerizable monomer(s) while in contact with the substrate 12, without premature monomer polymerization.

The polymerization solution preferably also includes a cross-linker for the monomer. Any cross-linker compatible with the organic monomer and capable of, and suitable for, cross-liking the organic monomer may be used. However, the cross-linker is preferably selected from the group consisting of phenol formaldehyde, terephthaladehyde, and N,N'-methylene bisacrylamide (MBA) and mixtures thereof. In the preferred embodiment, the cross-linker is comprised of N,N'-methylene bisacrylamide in an amount sufficient to form a water-insoluble polymer, in-situ.

Any amount of the cross-linker or any ratio of the cross-linker to the monomer sufficient to cross-link the monomer to achieve water-insolubility may be used. However, as indicated above, the actual amount or ratio of cross-linker used will vary depending upon, among other factors, the desired characteristics or properties of the hydraulic barrier material 10, including its water-absorbing capacity (WAC). For instance, it has been found that as the ratio of the cross-linker to the monomer is increased, the water solubility of the resulting absorbent polymer tends to decrease. However, in addition, as the ratio of the cross-linker to the monomer is increased, the water-absorbing capacity (WAC) of the resulting absorbent polymer tends to decrease. Thus, a desired balance must be achieved between the WAC and the water solubility of the absorbent polymer comprising the hydraulic barrier material 10. In one embodiment, the ratio by weight of the cross-linker to the monomer contained in the slurry 14 is less than about 1:100, preferably between about 1:1000 and about 1:100, more preferably in the range of 1:750 to 1:250, most preferably in the range of 1:600 to 1:400.

Further, the polymerization solution or slurry is preferably an acidic solution. Specifically, the polymerization solution preferably has a pH level of less than 7. The pH level of the polymerization solution may be adjusted in any manner and by any substance or compound able to provide the acidic solution and which is compatible with the components comprising the polymerization solution. However, the polymerization solution is preferably further comprised of a sufficient amount of a caustic compound to neutralize preferably 50–100 mole %, more preferably 50–90 mole % of the monomer, e.g., acrylic acid, which forms a neutralized polyacrylate, in-situ, most preferably 65–85 mole %.

Any caustic compound can be used that is capable of at least partially neutralizing the monomer or the formed polymer. Preferably, the caustic compound is selected from the group consisting of sodium hydroxide, potassium hydroxide, ammonium hydroxide, and mixtures thereof. In the preferred embodiment, the caustic compound is sodium hydroxide.

As indicated previously, an amount of water-swellable clay may be added to the polymerization solution to form the slurry 14. In this embodiment, any clay able to be added or mixed with the polymerization solution to form the slurry 14, as described above, may be used. The preferred water-swellable clays are smectite clays selected from the group consisting of montmorillonite, saponite, nontronite, laponite, beidellite, iron-saponite, hectorite, sauconite, stevensite, and mixtures thereof. The preferred clays are smectite clays, preferably a sodium smectite clay, particularly sodium montmorillonite and sodium bentonite. Other, non-water-swellable clays or fillers can be added to the polymerization solution, such as calcium carbonate, talc, mica, vermiculite, kaolin, titanium dioxide, silicon dioxide, and the like, so long as the polymerization solution (in this clay embodiment) includes at least about 5% water-swellable clay, preferably at least about 20% by weight water-swellable clay.

The particular weight ratio or relative amounts of the organic monomer and clay preferably will be selected to fall within the ratio of about 20% to about 50% by weight monomer (including neutralizing agent) and about 50% to about 80% by weight clay, based on the total weight of monomer, neutralized monomer and clay in the polymerization slurry.

In accordance with an important feature of the preferred methods and articles described herein, the polymerization slurry 14 should contain less than about 50% by weight water, preferably less than about 40% by weight water, based on the total weight of the slurry 14. Preferably, the slurry 14 comprises between about 30 percent and about 50 percent water by total weight of the slurry 14. In the preferred embodiment, the slurry 14 includes between about 35 percent by weight and about 45 percent by weight water based on the total weight of the slurry 14, to permit pumping via piston 32. A slurry having as low as about 20% by weight water can be conveyed to the substrate 12 for embedding into the substrate using a conveyor (not shown) while providing sufficient water for homogeneous distribution of the monomer throughout the clay and substrate 12.

Referring to the drawing, an apparatus and method are provided for continuously producing the hydraulic barrier material 10. First, a layer of the geotextile material comprising the fibrous substrate 12 is fed through a bath of polymerization catalyst or polymerization initiator 20 and passed through a pair of squeeze rollers 22 to remove excess catalyst and/or initiator. Alternatively, the polymerization catalyst and/or polymerization initiator can be spray-applied to the substrate 12 from spray nozzles 31. In accordance with a preferred embodiment, the substrate is saturated with the polymerization catalyst and/or polymerization initiator followed by applying vacuum to the undersurface 33 of the saturated substrate 12 by vacuum device 35 that is in contact with the undersurface 33 of the saturated substrate 12 for removal of the excess polymerization catalyst and/or polymerization initiator for recycle to the process. The catalyst-loaded and/or initiator-loaded fibrous substrate 12, after removal of excess catalyst and/or initiator, then is fed under guide roller 24 and between a pair of horizontally disposed embedding rollers 18, where the slurry 14 is squeezed (compressed) into the catalyst-containing and/or initiator-containing (polymerization-initiating) substrate 12.

The polymerization solution or slurry 14 is mixed in slurry container 26 where the slurry components are mixed with a mixer 16. Once mixed and preferably sheared in slurry container 26, where the polymerization solution includes a water-swellable clay, the mixer 16 is raised from the container 26 and the container 26 is moved along tracks 28 so that the container 26 is disposed directly under piston pump assembly 30 that includes a high pressure, vertically moveable piston 32. Piston 32 then is moved downwardly within container 26 to force the high viscosity, low water content slurry 14 through a flexible 8 inch diameter conduit 29 for spreading the slurry into a V-shaped slurry-receiving trough area between the squeeze rollers 18. The high viscosity slurry 14 is difficult to force through a narrow conduit so that it is preferred to use a conduit 29 that has a diameter of at least about 4 inches. Between the squeeze rollers 18, the slurry 14 is deposited onto the layer of the geotextile comprising the fibrous substrate 12 containing a polymerization-initiating catalyst and/or initiator, as the substrate 12 is moved between the squeeze rollers 18. The squeeze rollers 18 force the slurry 14 into the substrate 12 with sufficient pressure to embed the slurry 14 into the entire thickness of the substrate 12. As shown in FIG. 1, the geotextile material 12 containing the polymerization catalyst and/or polymerization initiator passes in contact with embedding rollers 18, which applies a compressive force to embed the slurry 14 between the fibers of the fibrous substrate 12. Further, the rollers 18 provide sufficient shearing of the polymerization slurry to intercalate the clay with monomer, and at least partially exfoliate the clay into individual platelets, if not already intercalated and exfoliated by mixer 16.

When polymerization solution 14 does not contain clay, the solution 14 is not generally so viscous that it is difficult to pump to the sheet material 12 and may be applied to the polymerization-initiating sheet material 12 by spray heads 37 or applied, for example, at the trough 39 between squeeze rollers 18 in any other manner.

The compressed geotextile with the embedded slurry 14 then passes through a heater or oven 34 for polymerizing the monomer and to interlock the resulting polymer and the clay, clay tactoids, and clay platelets into the substrate 12. The polymerization results in the interlocking of the resulting polymer and clay with the fibers of the geotextile material. As a result, the hydraulic barrier material 10 is formed. If necessary, the hydraulic barrier material 10 may be subsequently further dried and later rolled and packaged.

The hydraulic barrier material 10 will expand when contacted with water. It has been found that upon contact with water, the unfilled voids or interstitial spaces of the fibrous substrate 12 will first fill up with hydrated polymer gel. Further hydration of the polymer gel will cause the entire hydraulic barrier material 10 to expand. Further, it has been found that under a standard load of an effective confining stress of 20 kPa, the hydraulic conductivity of the hydraulic barrier material described herein tends to be less than or equal to about $1 \times 10^{-9}$ cm/sec. Further, the hydraulic conductivity has been generally found to decrease as the effective confining stress is increased.

EXAMPLES

A polymerization slurry was mixed containing 354 pounds (11.91% by weight) acrylic acid; 1119 pounds (37.65% by weight) of sodium montmorillonite clay; 314 pounds of 50% active NaOH solution (5.28% by weight active NaOH); 1184 pounds of water (45.12% by weight-including water added with NaOH); and 0.772 pounds (0.03% by weight) of methylene bisacrylamide (MBA) cross-linking agent. The NaOH added was sufficient to neutralize 80 mole percent of the acrylic acid.

The slurry was embedded in the Foss, Inc. GEO-4-REEMAY 60 polyester fabric having a thickness of 2 mm and a basis weight of 0.34 pound/ft$^2$ that was pre-dipped in a polymerization initiator (a sodium persulfate solution containing 16–30% active sodium persulfate) to fully saturate the sheet material such that the fabric, after vacuum removed of excess initiator, contains 2.8 grams of sodium persulfate initiator per ft$^2$ of fabric prior to embedding the slurry therein. In the preferred embodiment, the fabric is loaded with 4 to 14 grams of sodium persulfate aqueous solution (28% active) on each square foot of fabric to total 2.8 grams of sodium persulfate per square foot, and the polymerization-initiating fabric is subsequently embedded with 28 grams per square foot of acrylic acid. The preferred wet loading of the polymerization solution is 232 grams of slurry per square foot of fabric. Five different samples were prepared, each loaded with different weights of the slurry and each polymerized, in-situ, at different oven temperatures. The data shown in Table I shows that at the lower temperatures of 191° C. to 232° C., better impermeabilities resulted in testing both deionized water permeability (DI Perm) and 3.5% NaCl water (3.5% Salt Perm):

TABLE I

| Sample | Oven Temp deg C. | Loading lb/sq. ft. | Free Swell (wet wt/dry wt) | DI Perm cm/s | 3.5% Salt Perm cm/s |
|---|---|---|---|---|---|
| 1 | 191 | 0.2766 | 13.307 | $7.80 \times 10^{-10}$ | $1.70 \times 10^{-10}$ |
| 2 | 204 | 0.2959 | 12.004 | $9.06 \times 10^{-10}$ | $2.40 \times 10^{-10}$ |
| 3 | 218 | 0.2823 | 13.510 | $1.20 \times 10^{-09}$ | $2.90 \times 10^{-10}$ |
| 4 | 232 | 0.2488 | 14.362 | $8.40 \times 10^{-10}$ | $2.60 \times 10^{-10}$ |
| 5 | 246 | 0.2877 | 14.318 | $8.30 \times 10^{-10}$ | $6.00 \times 10^{-10}$ |

TABLE II

Comparative Prior Art
ST Bentomat Hydraulic Barrier

| Clay Loading | DI Permeability | Saltwater Permeability cm/sec. |
|---|---|---|
| 0.85 lb/ft$^2$ | $2.60 \times 10^{-9}$ cm/sec. | $5.0 \times 10^{-6}$ cm/sec. |

A comparison of the water permeability achieved in according with the hydraulic barriers described herein (Table I) with a typical prior art ST Bentonite Hydraulic Barrier (Table II) shows very unexpectedly low water permeability for the hydraulic barriers manufactured in accordance with the present invention, particularly for salt-contaminated water. The prior art hydraulic barrier compositions, having about 3 times as much clay loading, permit about 3000 times more salt-contaminated water to pass through than the hydraulic barrier compositions described herein. For deionized water, the prior art hydraulic barrier compositions, again containing about 3 times the weight of clay loaded therein, compared to the clay loading of the compositions described herein, permits about 3 times more deionized water to pass through the composition than the hydraulic barrier compositions described herein.

What is claimed is:

1. A method of manufacturing a polymer-containing sheet material comprising:
   contacting a liquid-sorbent sheet material, or material used to make the liquid-sorbent sheet material, with a polymerization initiator or polymerization catalyst in an amount sufficient to initiate polymerization of a later added polymerizable monomer to produce a polymerization-initiating sheet material;
   embedding a polymerization solution, containing a polymerizable monomer throughout at least a portion of the thickness of the polymerization-initiating sheet material for intimate contact with said polymerization catalyst or polymerization initiator to initiate polymerization of the monomer; and
   subjecting the sheet material to conditions sufficient to polymerize the monomer, in-situ, to form a polymer embedded in the sheet material, thereby securing the polymer to the sheet material.

2. A method in accordance with claim 1, wherein the polymerization solution contains a cross-linking agent for the polymer, but contains no polymerization catalyst or polymerization initiator.

3. A method in accordance with claim 2, wherein the polymerization solution includes a carrier selected from the group consisting of water, an organic solvent, and the polymerizable monomer in an amount sufficient to solubilize or disperse the cross-linking agent throughout the monomer.

4. A method in accordance with claim 1, wherein the sheet material, or a material contained in the sheet material, is loaded with a cross-linking agent and a neutralizing agent for the monomer in addition to the polymerization catalyst or polymerization initiator, prior to embedding the monomer into the sheet material.

5. A method in accordance with claim 4, wherein the neutralizing agent is loaded into the sheet material in an amount sufficient to neutralize the polymer 50–100 mole percent.

6. A method in accordance with claim 4, wherein the neutralizing agent is loaded into the sheet material in an amount sufficient to neutralize the polymer 65–85 mole percent.

7. A method in accordance with claim 1, wherein the sheet material is heated to a temperature of at least 100° C. to effect polymerization of the monomer in the sheet material and to evaporate water from the sheet material during polymerization and curing of the polymer.

8. A method in accordance with claim 7, wherein the sheet material is conveyed through an oven at a temperature of about 177° C. to about 288° C. to polymerize the monomer and cure the in-situ formed polymer.

9. A method in accordance with claim 8, wherein the oven has a temperature in the range of about 204° C. to about 260° C.

10. A method in accordance with claim 1, wherein the polymerization solution contains clay in an amount of about 5% to about 95% by weight, based on the total weight of clay and monomer.

11. A method in accordance with claim 10, wherein the clay comprises a water-swellable smectite clay.

12. A method in accordance with claim 11, wherein the water-swellable smectite clay comprises a sodium smectite clay.

13. A method in accordance with claim 12, wherein the sodium smectite clay is selected from the group consisting of sodium montmorillonite, sodium bentonite, and mixtures.

14. A method in accordance with claim 13, wherein the sodium smectite clay is produced by ion-exchanging sodium ions in place of calcium ions of calcium smectite clay.

15. A method in accordance with claim 10, wherein the polymerization solution contains about 25% to about 80% by weight water, based on the total weight of the polymerization solution.

16. A method in accordance with claim 15, wherein the polymerization solution contains about 30% to about 50% by weight water, based on the total weight of the polymerization solution.

17. A method in accordance with claim 16, wherein the polymerization solution contains about 30% to about 40% by weight water, based on the total weight of the polymerization solution.

18. A method in accordance with claim 10, wherein the clay comprises a water-swellable smectite clay and comprises at least about 50% by weight, based on the total weight of the polymerization solution.

19. A method in accordance with claim 18, wherein the clay comprises 50–100% by weight of a smectite clay, based on the total weight of clay in the polymerization solution.

20. A method of manufacturing a sheet material containing a plurality of structural reinforcing fibers surrounding a water-absorbing material selected from the group consisting of a water-absorbent polymer, a water absorbent clay, an organic compound adsorbent, and a combination thereof comprising
    embedding a polymerizable monomer in the reinforcing fibers to dispose the monomer between, within and/or on a surface of the reinforcing fibers to provide a plurality of polymerizable monomer-carrying fibers;
    embedding a particulate solid material between at least a portion of the polymerizable monomer-carrying fibers; and
    polymerizing the monomer to secure contacting fibers in position with formed polymer surrounding or entrapping the particulate solid material between polymer-carrying fibers.

21. The method of claim 20, wherein the particulate solid material is a water-absorbing material.

22. The method of claim 21, wherein the water-absorbing material is selected from the group consisting of a water-absorbent polymer and a water-swellable clay.

23. The method of claim 20, wherein the particulate solid material is an organic compound-adsorbent.

24. The method of claim 23, wherein the organic compound-adsorbent material is selected from the group consisting of an organophilic clay and a zeolite.

25. The method of claim 20 further including compressing the fibers together to densify the sheet material, and holding the fibers in the compressed state until the polymer solidifies at a temperature below its melt temperature to maintain the sheet material in the densified condition.

26. A method of manufacturing a fabric at least partially filled with a powdered or granular material selected from the group consisting of a water-swellable clay, an organic compound-adsorbent material, and a combination thereof comprising:
    depositing fibers onto a support surface to form a loose mat of fibers having spaces between adjacent fibers, and wherein each fiber contacts at least one adjacent fiber;
    embedding a particulate solid material between at least a portion of the polymerizable monomer-carrying fibers;
    depositing the powdered or granular material among the fibers such that the powdered or granular material is received in a portion of the spaces between adjacent fibers;
    densifying the fibers to eliminate a substantial portion of said spaces that are not filled with powdered or granule material and to provide additional fiber-to-fiber contact;
    polymerizing said polymerizable monomer to form a polymer coating on at least a portion of the fibers, and cooling the polymer coating to below its melt temperature to fuse adjacent, contacting polymer coated fibers together via fused polymer while the fibers are in the densified condition.

27. A method of manufacturing a polymer-containing sheet material comprising:
    applying a polymerizable monomer to fibers to form monomer-carrying fibers;
    intermingling the monomer-carrying fibers to form a woven or non-woven sheet material having adjacent contacting fibers;
    polymerizing the monomer carried by the fibers to form a polymer melt-containing sheet material, wherein said contacting fibers are connected by said polymer melt; and
    solidifying the polymer melt to securely interconnect said fibers with said polymer.

28. A method of manufacturing a polymer-containing sheet material in accordance with claim 27, including the step of applying a polymerization initiator or polymerization catalyst to said fibers before, during or after applying the monomer to the fibers.

29. A method of manufacturing a polymer-containing sheet material comprising applying a polymerization catalyst or polymerization initiator to fibers to form polymerization-initiating fibers;
    intermingling the polymerization-initiating fibers to form a polymerization-initiating sheet material having adjacent contacting fibers;
    applying a polymerizable monomer to said polymerization-initiating fibers to form monomer-carrying fibers;
    polymerizing the monomer carried by the fibers to form a polymer melt-containing sheet material, wherein said contacting fibers are connected by said polymer melt; and
    solidifying the polymer melt to securely interconnect said fibers with said polymer.

30. A method in accordance with claim 29, wherein the monomer is applied to said polymerization-initiating fibers after forming the polymerization-initiating sheet material.

31. A method in accordance with claim 29, wherein the monomer is applied to said polymerization-initiating fibers before forming the polymerization initiating sheet material.

32. A method in accordance with claim 29, further including the step of applying the polymerizable monomer to said polymerization-initiating sheet material by embedding a slurry of monomer and a water-swellable clay into the polymerization-initiating sheet material.

* * * * *